Sept. 26, 1944.   A. M. BARRETT   2,358,957
LIFT TRUCK
Filed Jan. 10, 1942   5 Sheets-Sheet 2

INVENTOR.
Arthur M. Barrett
BY

Sept. 26, 1944. A. M. BARRETT 2,358,957
LIFT TRUCK
Filed Jan. 10, 1942 5 Sheets-Sheet 3

INVENTOR.
Arthur M. Barrett
BY
Brown, Jackson, Boettcher & Dienner
Attys.

Sept. 26, 1944.  A. M. BARRETT  2,358,957
LIFT TRUCK
Filed Jan. 10, 1942   5 Sheets-Sheet 4

INVENTOR.
Arthur M. Barrett
BY
Brown, Jackson, Boettcher & Dienner
Attys.

Sept. 26, 1944.    A. M. BARRETT    2,358,957
LIFT TRUCK
Filed Jan. 10, 1942    5 Sheets-Sheet 5

INVENTOR.
Arthur M. Barrett
BY
Attys.

Patented Sept. 26, 1944

2,358,957

UNITED STATES PATENT OFFICE 2,358,957

LIFT TRUCK

Arthur M. Barrett, Winnetka, Ill., assignor to Barrett-Cravens Company, Chicago, Ill., a corporation of Illinois Application January 10, 1942, Serial No. 426,332

19 Claims. (Cl. 254—10)

The present invention relates to lift trucks of the type designed to be backed under a low platform on which the load is placed, for lifting the platform and its load to transport the load from place to place. The truck comprises a front crosshead which is supported on a pair of steerable front wheels, and also comprises a frame structure which extends rearwardly from this crosshead and is supported on a pair of rear wheels. The truck is adapted to be propelled and steered through the medium of a tongue-like handle which is pivotally supported on said front crosshead and has dirigible connection with said front steering wheels. This handle also serves as a lifting lever to transmit lifting force through intermediate lifting mechanism to the rearwardly extending frame structure.

One of the objects of the present invention is to provide an improved lift truck wherein the rearwardly extending frame structure is in the form of a single frame which serves the dual purpose of a lifting frame and also of a wheel bearing or wheel supporting frame. By making the single frame structure serve this dual purpose of a lifting frame and also of a wheeled frame, on which the rear wheels are mounted, a much cheaper construction can be obtained; and, furthermore, a much lower construction can be obtained than when the lifting frame is one structure and the wheeled frame is another structure. This lower construction particularly adapts the present truck to utility as a pallet truck for lifting pallet platforms, which are usually lower than the conventional load carrying skids or platforms.

Another object of the invention is to provide an improved lift truck wherein the front crosshead and the rear frame structure are pivotally connected together by vertically spaced parallel links. This results in the lifting and lowering movements of the rear frame structure occurring with a parallel link motion wherein the major component of the parallel link motion is in a vertical direction, and only a relatively small component of this motion is in a horizontal direction. Such arrangement produces a shorter, more compact truck, and also results in other structural and operating advantages.

Another object of the invention is to provide a lift truck of the above general description characterized by improved mechanism for causing the rear supporting wheels to lift and lower the rear end of the rear frame structure in the operations of lifting and lowering the load.

Another object of the invention is to provide improved hydraulic lift mechanism for raising and lowering the lifting frame.

Another object of the invention is to provide an improved construction of hydraulic pump unit, and an improved mounting of this pump unit on the front crosshead.

Another object of the invention is to provide an improved construction of hydraulic lifting ram unit, and an improved mounting of this ram unit between the front crosshead and the rear frame structure.

Another object of the invention is to provide an improved construction and arrangement of controls for the hydraulic lifting mechanism.

Other objects, features, and advantages of the invention will appear from the following detailed description of one preferred embodiment thereof. In the accompanying drawings illustrating such embodiment:

Figure 7 is a fragmentary side elevational view of the rear portion of the truck, showing the lifting frame raised substantially to its uppermost lifting position; and Figure 8 is a fragmentary detail view showing the mounting of the pedal which opens the by-pass valve.

Figure 1:
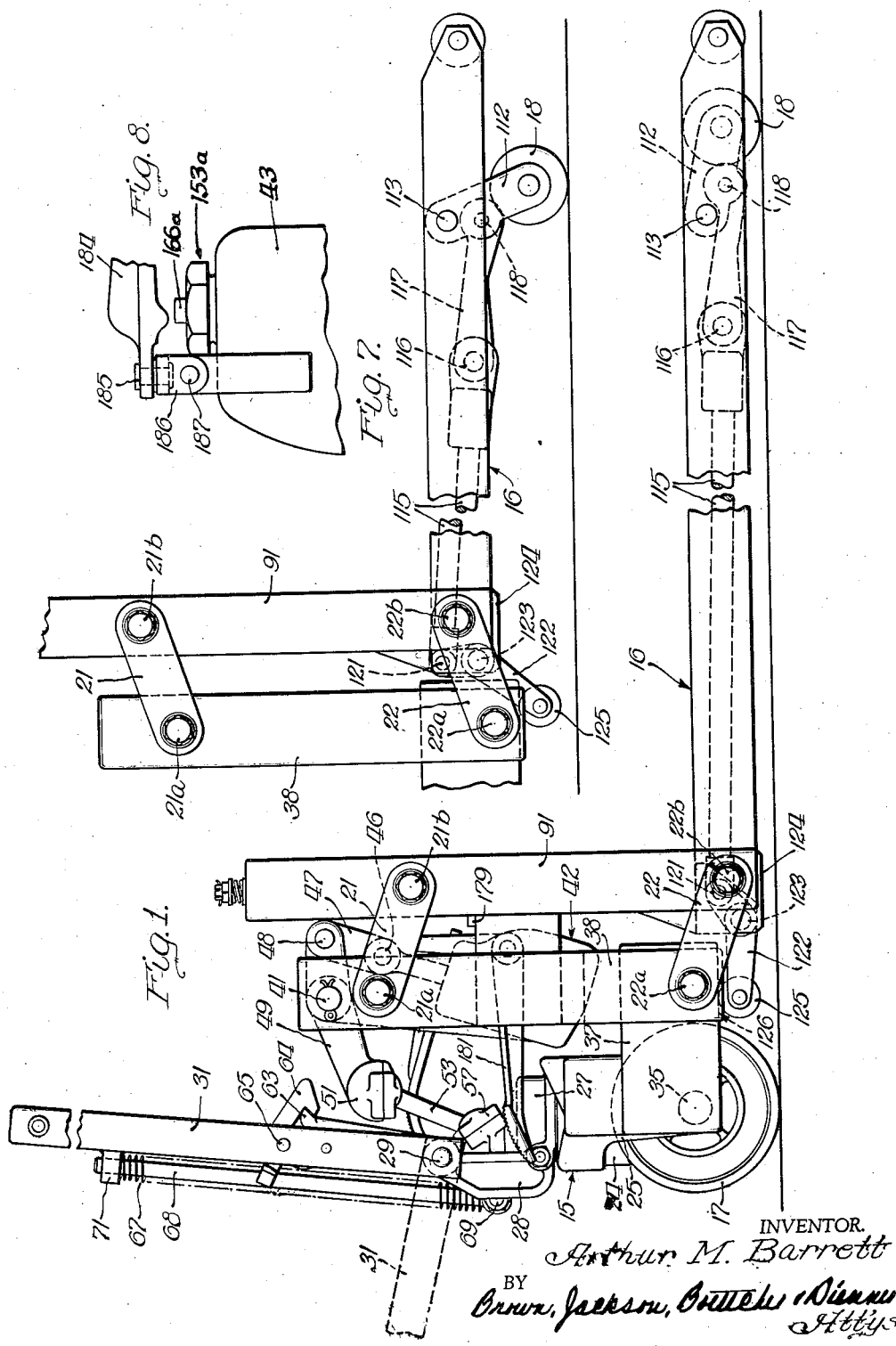
Figure 1 is a fragmentary side elevational view of my improved lift truck.

The front crosshead unit of the truck is designated 15 in its entirety, and the rear frame unit is designated 16 in its entirety. The crosshead unit is supported on steerable front wheels 17, and the frame unit is supported on load lifting rear wheels 18. The frame unit is movably connected to the crosshead unit through pairs of vertically spaced parallel links 21 and 22 disposed at each side of the truck. The front ends of these connecting links are mounted on front pivot pins 21a and 22a carried in vertically spaced relation on the front crosshead unit, and the rear ends of the links are mounted on rear pivot pins 21b and 22b carried in vertically spaced relation on the rear frame unit.

The crosshead unit comprises a central bearing hub 24, from the sides of which project the laterally extending crosshead arms or yoke portions 25. Rotatably mounted in the bearing hub 24 is a vertical steering spindle 26 which has a steering head or collar 27 secured to its upper end, above the hub 24. A bracket 28 extends upwardly from the forward portion of the head 27 and carries a transverse pivot pin 29 on which the steering and lifting handle 31 is pivotally mounted. Secured to or formed integral with the lower end of the steering spindle 26 is a steering yoke 34 having downwardly extending ends which carry an axle pin or pins 35 on which the front wheels 17 are mounted. It will be evident that when the operating handle 31 is swung down into the general locality of the dotted line position shown in Figure 1, the truck can be pushed and pulled through this handle, and can also be steered by swinging the handle from one side to the other, such serving to swivel the steering spindle 26 in the crosshead hub and thereby turning the steering wheels 17 in one direction or the other.

The outer ends of the crosshead arms 25 are formed with rearwardly extending portions 37. Extending upwardly from each of the rearwardly extending portions is a substantially vertical arm portion 38 which may either be formed integral with the rearwardly extending arm portion 37 or may be bolted thereto. These vertical arms carry the upper and lower pairs of pivot bolts 21a and 22a on which the front ends of the links 21, 22 are mounted. Extending transversely between the upper ends of the vertical arms 38 is a horizontal pivot pin 41. Suspended from this transverse shaft is the pump unit 42. This comprises a main casting 43 which houses the pump cylinder and oil reservoir as will be later described, and said pump unit also comprises two laterally spaced supporting arms 44, 44' which extend upwardly from the main body of the pump unit and are formed with bosses at their upper ends which have mounting on the transverse shaft 41. The pump unit is held against swinging about this overhead point of suspension by providing lugs 49 which project inwardly from the supporting arms 38 and engage in slots 50 recessed out in the end walls of the casting 43. This permits easy assembly and disassembly of the parts, as will be later described. A piston rod 45 extending upwardly out of the pump unit is formed with a pivot eye 45' at its upper end which is connected by pivot pin 46 to the lower end of a motion transmitting link 47. The upper end of the link 47 is pivotally connected at 48 with the rear arms of a rocker lever 49 which has rocking support on the transverse shaft 41 between the pump supporting arms 44. The forward arm of the rocker lever 49 is formed with a downwardly facing semi-spherical socket 51 in which is seated a ball 52 which is fastened to the upper end of a push strut or link 53. A retaining ring 54 secured to the lower portion of the socket 51 holds the ball 52 in place in said socket, while permitting a large degree of angular movement of the strut 53 both fore and aft and sidewise relatively to the rocker lever 49. The lower end of the strut link 53 carries a similar ball 56 which is seated in a semi-spherical socket 57, in which socket it is retained by the removable ring 58. Said socket member 57 is formed in the lower arm of a pumping lever 61 which is mounted on the transverse pivot pin 29, being assembled on this pin between forked arms at the upper end of the bracket 28, and between forked arms formed at the lower end of the operating handle 31. The upper arm of the pumping lever 61 is formed with a nose 63 over the back of which is adapted to engage a latch 64 which is pivoted at 65 on the operating handle 31. The latch 64 is formed with a treadle portion 64a which projects forwardly from the other side of the operating handle 31, and which the operator can readily depress with his foot when he desires to free the hook 64b of the latch from the nose 63 of the pumping lever 61. By thus releasing the latch 64 from the lever 61, the operating handle 31 can be swung down to a suitable angle for pulling or backing the truck, as typically represented by the dotted line position in Figure 1, without having such manipulating movements of the handle transmitted as stroking movements to the hydraulic pump unit. The operating handle 31 is substantially counterbalanced when in this lower pulling and steering position by the instrumentality of a compression spring 67 which surrounds a counterbalancing rod 68. The lower end of the rod is pivotally connected to the bracket 28 at 69, and the upper end of the rod has sliding engagement in a lug 71 projecting from the handle 31, the spring 67 abutting against the under side of this lug. After the operator has backed the lifting truck under the pallet or other load carrying platform, he swings the handle 31 up to the full line position shown in Figure 1, which causes the gravity latch 64 to automatically hook itself over the nose 63 of the pumping lever 61. Thereupon, by forward and back stroking of the handle 31, the operator can transmit pumping movement to the hydraulic pump unit 42. It will be observed that if space is restricted for performing the pumping movement in the fore and aft plane of the lift truck, the operator can swivel the handle 31 and steering truck to one side or the other for performing the pumping operation, the universal joints 51, 52 and 56, 57 accommodating such different angular positions of the handle 31.

The oil is conducted under pressure from the pump unit 42 through a flexible conduit 72 to a hydraulic ram unit 73 which is adapted to transmit lifting force from the front crosshead unit 15 to the rear frame structure 16. Said ram or jack unit 73 comprises a cylinder 74, from the upper end of which extends a piston rod 75. A flanged head 76 closing the lower end of the cylinder has tiltable mounting on a supporting shelf or bracket 77 which projects rearwardly from between the vertically extending arms 38 of the crosshead unit. A semi-spherical socket 81, formed in the under side of the cylinder head 76, has rockable support on a semi-spherical mounting stud 82 projecting upwardly from the supporting shelf 77. These spherical seating surfaces are held together under resilient pressure by two laterally positioned tie bolts 83 which have their upper headed ends engaging in slotted openings 84 formed in the projecting flange of the cylinder head 76. These tie bolts extend down through suitable openings in the supporting shelf 77, and carry compression springs 86 at their lower ends, which exert a downward pressure on the cylinder head, holding the seating surfaces 81 and 82 in firm contact, while permitting the necessary fore and aft tilting movement of the cylinder to accommodate the lifting movement of the frame structure 16. The piston rod 75 transmits its lifting force upwardly against the top of an arched or looped frame structure comprising side frame bars 91 and a transverse top bar 92. These vertical side bars 91 constitute a rigid forward portion of the lifting frame 16, and carry the upper and lower pairs of pivot bolts 21b and 22b on which the rear ends of the mounting links 21 and 22 are pivoted. The hydraulic ram assembly 73 is mounted between these vertical side bars 91. The upper end of the piston rod 75 has pivotal mounting on the pin 94 extending transversely through a yoke 95. A semi-spherical thrusting surface 98 formed at the extremity of the piston rod is adapted to engage a corresponding semi-spherical seating surface 99 formed in a block 101 carried by the upper cross bar 92. Slotted openings 103 in the ends of the yoke 95 receive the headed ends of spring bolts 104 which extend upwardly through the cross bar 92. Compression springs 106 on the upper ends of the bolts 104 transmit upward pressure to the yoke 95 for maintaining the thrusting surfaces 98 and 99 under spring pressure. The spherical formation of these seating surfaces accommodates the fore and aft tilting movement of the piston rod relatively to the end structure 91, 92 of the lifting frame.

It will be apparent that as the pumping unit 42 forces oil into the hydraulic ram 73, the upward movement of the piston rod 75 will cause the arched frame structure 91, 92 and the forward portion of the lifting frame 16 to move upwardly with a parallel link motion, as determined by the parallel links 21 and 22. The rear end of the lifting frame 16 is caused to move upwardly substantially concurrently with the front end through the medium of lifting linkage operative between the frame 16 and the rear wheels 18.

Figure 2:
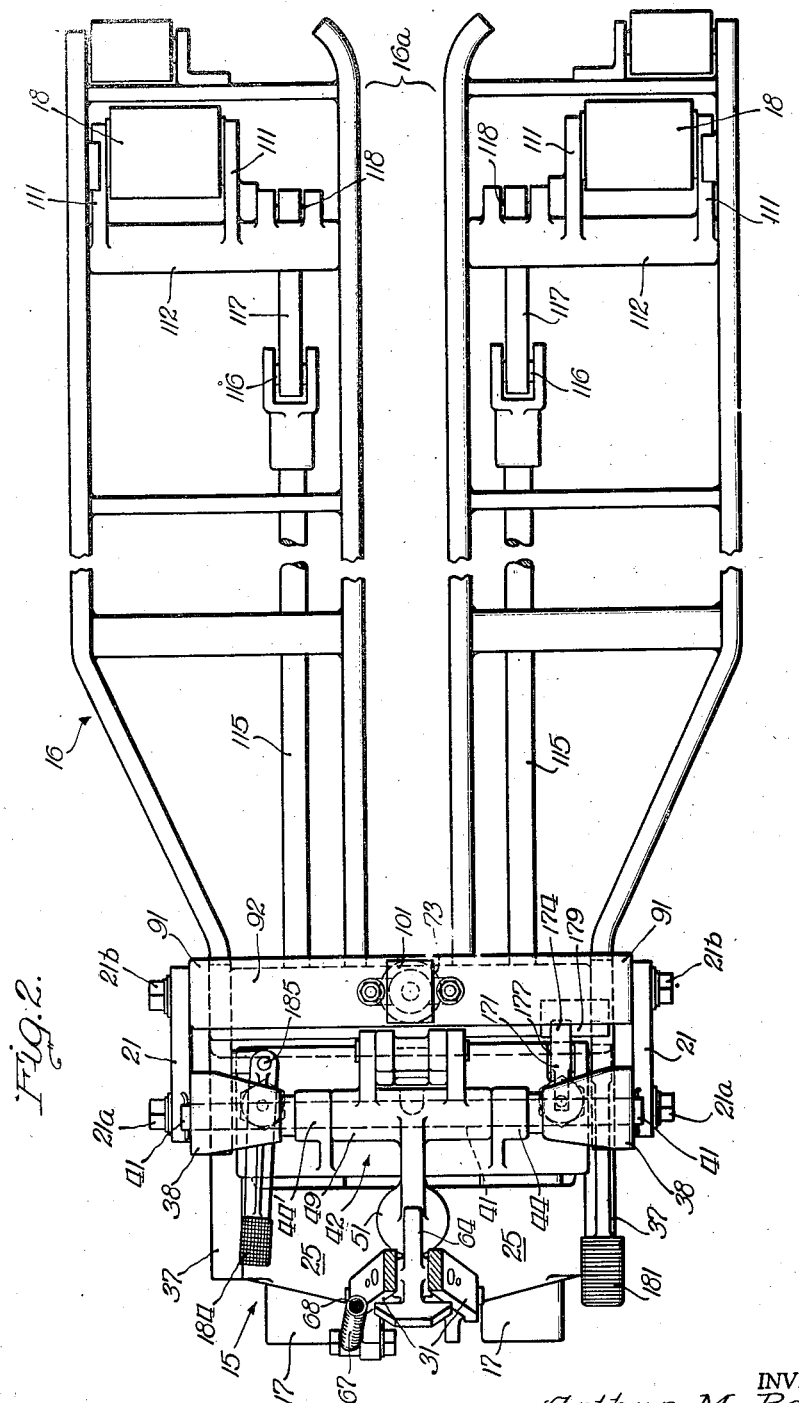
Figure 2 is a fragmentary plan view of the same.

Referring now to the construction of this lifting linkage, it will be noted from Figure 2 that each rear wheel 18 is pivotally mounted between the arms 111 of a lifting yoke 112 which is rotatably mounted on a transverse trunnion pin 113 carried by the lifting frame 16. Figure 2 illustrates the frame as being of two-part construction to define the central slot 16a for receiving central supporting legs under wide load carrying platforms and the like. When the lifting frame is of this two-part construction, separate lifting trunnions 112, 112 are provided in each of the lateral frame parts for mounting each of the rear wheels 18, but it will be understood that in a single-part frame structure, having no central slot 16a, a single lifting trunnion 112 might be employed for mounting both rear wheels 18. These lifting yokes 112 are adapted to be swung downwardly and forwardly in a lifting operation through the actuation of pull rods 115. The rear ends of these pull rods are pivotally connected at 116 with curved links 117 which curve rearwardly and upwardly around the trunnion portions of the lifting yokes 112 for pivotal connection at 118 with the rear portions of the yokes. The operative connection is such that forward pulling motion exerted through the rods 115 and links 117 is operative to swing the lifting yokes 112 downwardly and forwardly for raising the rear end of the lifting frame, substantially as indicated in full lines in Figure 7. The front ends of the pull rods 115 have pivotal connection at 121 with the upper arms of individual bell crank levers 122 disposed at each side of the frame. Each bell crank lever is pivotally mounted at 123 on a suitable bearing bracket 124 anchored to the forward portion of the frame structure 16. A roller 125 mounted on the forwardly extending arm of each bell crank lever 122 is adapted to bear against an abutment surface 126 which is formed on the under side of the cross head unit 15, such as an under surface of each horizontally extending arm portion 37, between the vertically extending arm portions 38. It will be apparent that when the front end structure 91 of the lifting frame 16 starts moving upwardly with its parallel link motion in the lifting operation, the rollers 125 will exert reaction pressures against the surfaces 126 which will oscillate the bell crank levers 122 in counterclockwise directions about their pivots 123. This will pull the rods 115 in a forward direction and swing the lifting forks 112 downwardly and forwardly for swinging the rear wheels 18 in such downward and forward direction, whereby the rear end of the lifting frame 16 is raised substantially concurrently with the front end of the frame. In the reverse operation of lowering the lifting frame structure, the downward motion of the front end of the frame structure obviously allows the bell crank levers 122 to rotate in the reverse direction for permitting the lifting yokes 112 and wheels 18 to move backwardly and upwardly with respect to the frame structure, whereby the rear portion of the frame structure also lowers at substantially the same rate as the front end. By virtue of constructing the single frame structure 16 to perform the twofold function of mounting the rear wheels 18 and also of lifting the load, it is possible to obtain a much lower construction of lifting truck than where two parallel frame structures are employed, one for mounting the wheels and the other for lifting the load. The pull rods 115, links 117 and bell crank levers 122 are confined as much as possible within the top and bottom dimensions of the horizontal frame rails 16 to retain the advantages of the low construction.

Figure 4:
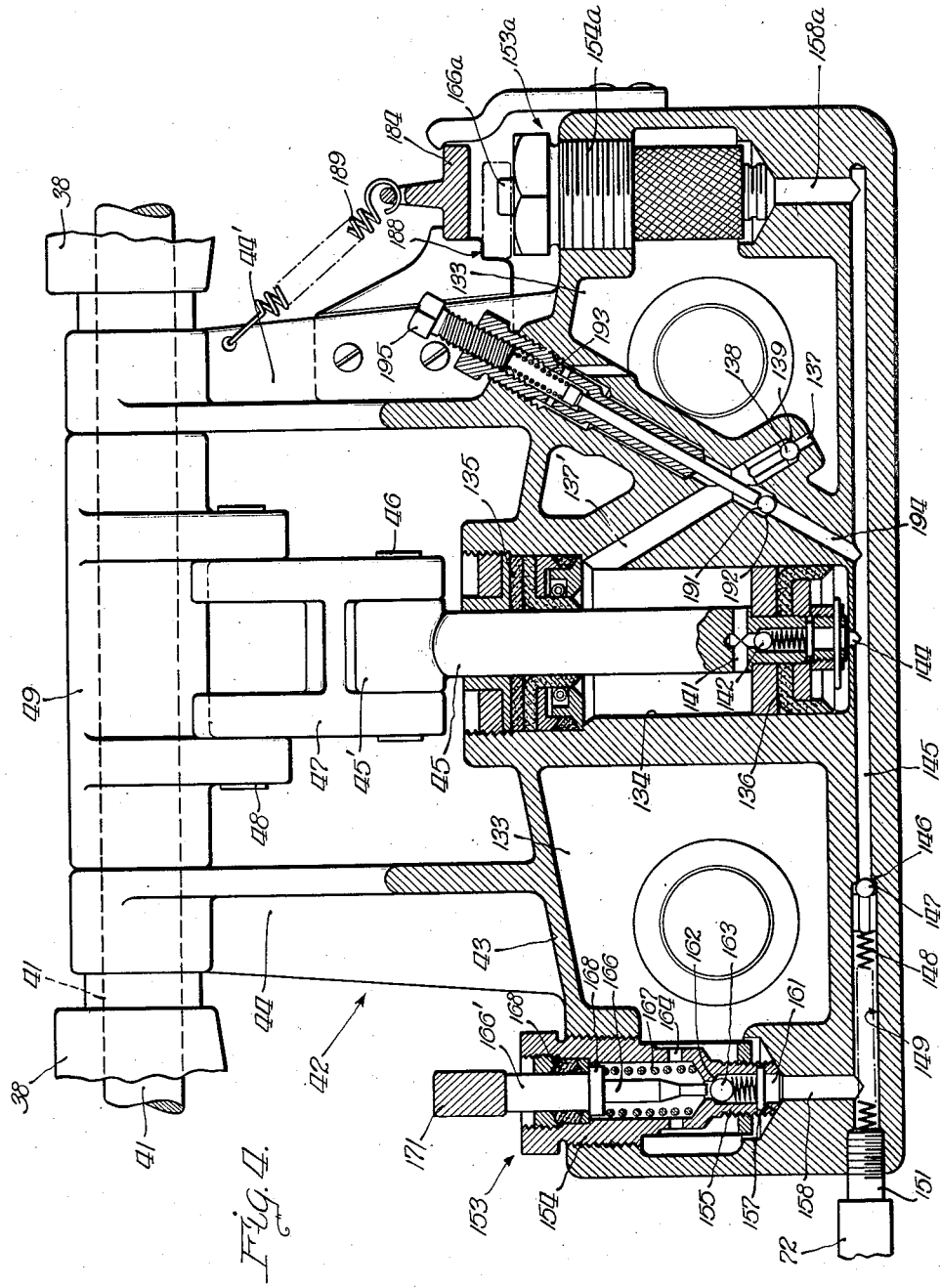
Figure 4 is a sectional view through the pump unit taken approximately on the plane of the line 4—4 of Figure 3.

Referring now to improved features in the pump unit 42, it will be seen from Figure 4 that the pump casting 43 is cored out to form the relatively large oil reservoir 133, in the center of which is cored the pumping cylinder 134. The piston rod 45 enters the top of the cylinder through a suitable gland packing 135 and carries a piston 136 at its lower end. Oil enters the cylinder from the reservoir 133 through an inlet passageway 137 containing a suitable inlet valve 138 normally seating on a valve seat 139 formed in said passageway, an extension 137' of said passageway leading to the upper end of the cylinder space 134. On the upstroke of the piston 136, oil is transferred from the upper side of the piston to the lower side thereof through a transfer passageway 141 formed in the piston rod 45. A spring-pressed ball valve 142 prevents reverse flow through said passageway 141 on the downstroke of the piston. The oil is discharged from the cylinder through a downwardly extending discharge passageway 144 which opens into a horizontally extending passageway 145 formed at one end with a valve seat 146. A discharge valve 147 is normally pressed against said seat by a spring 148 confined within an enlarged extension 149 of the bore 145. A nipple or other suitable coupling member 151 is screwed into a threaded counterbore at the outer end of the bore 149, and establishes connection with the flexible conduit 72 which leads to the hydraulic ram unit 73.

A release valve 153 is located adjacent to the left hand end of the pumping unit casting, and is adapted to establish a by-pass or release duct from the discharge passageway 149 back to the reservoir 133. This release valve functions as a dual purpose valve adapted for both manual and automatic operation, the manual operation being for the purpose of allowing the oil to return from the ram unit back into the reservoir 133 in the operation of lowering the lifting frame section 16, and the automatic operation occurring as a limiting function for by-passing the oil when the lifting frame section reaches the upper limit of its predetermined range of lifting movement. The release valve comprises a plug-shaped valve body 154 which screws down into a threaded bore in the top wall of the pump unit, and which has a reduced lower end 155 formed with a tapered extremity for engaging a correspondingly tapered seat 157 which is machined concentrically of a passageway 158 leading upwardly from the passageway 149. The passageway 158 opens into a passageway 161 formed in the valve body 154, this passageway 161 leading to a valve port 162 which is normally closed by a spring-pressed valve 163. The valve port 162 has venting communication into the oil reservoir 133 through lateral ports 164 formed in the valve body 154. The valve 163 is adapted to be unseated from the port 162 by the downward movement of a plunger 166. A compression spring 167 bears against a collar 168 carried by the plunger and normally holds it in the raised position illustrated. An actuating extension or button portion 166' extends upwardly from the plunger through a packing gland 168, and is adapted to be pressed downwardly by a suitable operating lever. It will be evident that such downward movement of the plunger will force the valve 163 from its seat 162 and permit oil to flow from passageway 149 back into the oil reservoir 133.

Figure 3:
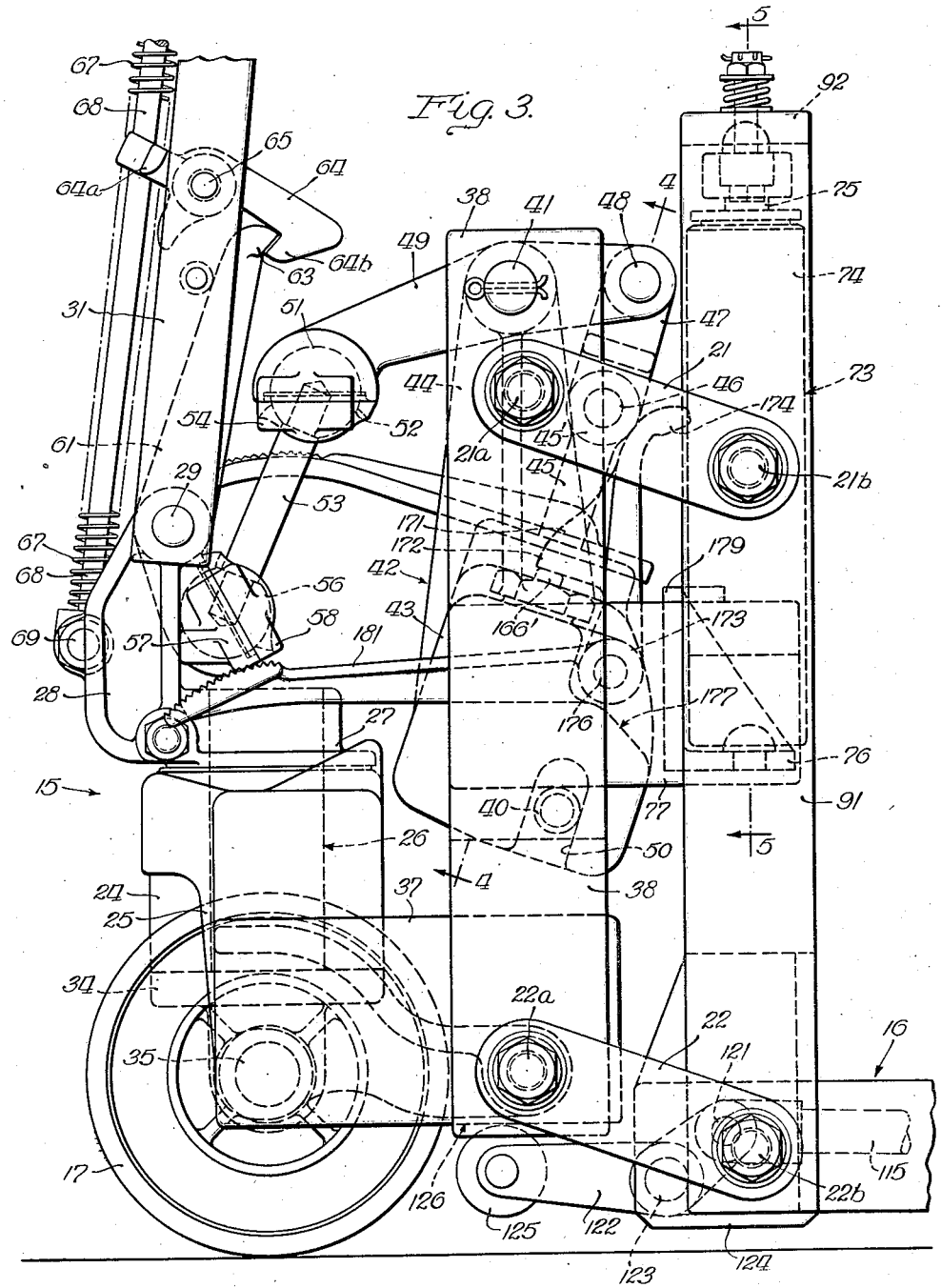
Figure 3 is a fragmentary side elevational view of the front portion of the truck on a larger scale.

The actuating lever which depresses the plunger 166 is indicated at 171, as best shown in Figures 2 and 3. The lever is formed with a nose portion 172 which normally lies in contact with or directly above the plunger button 166', and the lever is also formed with a downwardly extending hub portion 173 which is secured fast to a rocking shaft 176. An angular recess 177 is cored out of the back side of the casting 43, directly in rear of the release valve 153, and the hub portion 173 of the release lever is mounted on the rocking shaft 176 within this recess 177. An upper nose 174 on the release lever 171 is adapted to be engaged by an automatic tripping shoulder 179 which is carried by the arched frame structure 91—92 to which is connected the piston rod 75 of the ram unit 73. The engagement of the tripping shoulder 179 with the tripping extremity 174 of the lever 171 occurs when the lifting frame 16 has reached the upper predetermined limit of motion, at which time the lever 171 is caused to swing about its pivot axis 176 and depress the plunger button 166' for opening the release valve 153. This safety release feature prevents the possibility of injuring or breaking any of the parts which might otherwise result from the operator failing to stop the pumping operation when the lifting frame structure reached the upper limit of its movement.

The release valve 153 is adapted to be manually opened, as by the depressing of a foot treadle 181, when it is desired to lower the lifting frame structure. This foot treadle 181 may be formed as a laterally and forwardly projecting extension of the tripping lever 171, or it may be constructed as a separate casting for mounting on an outwardly projecting end of the rock shaft 176. In either type of construction, it will be evident that depressing this foot treadle opens the release valve 153 and permits the oil to have a return flow from the lifting ram unit 73 back to the reservoir 133, such resulting in the lowering of the lifting frame 16.

Referring now to another feature of the hydraulic pumping unit 42, it will be noted from Figure 4 that an idling or by-passing valve 153a is mounted in the right hand end of the casting 43. The construction and arrangement of all of the parts making up this valve 153a are a duplication of the construction and arrangement of the parts making up the release valve 153, and accordingly the same reference characters have been applied to these duplicate parts, with the suffix $a$ appended thereto. The outlet passageway 145 leading from the pump cylinder 134 is extended to the right for communication with the upwardly extending by-pass 158a. It will be noted that this by-pass passageway 158a has constant communication at all times with the lower end of the pumping cylinder 134 in such manner that it can by-pass the flow from the pumping cylinder when the plunger 166a is depressed. However, owing to the inter-position of the check valve 147 between the passageways 145 and 149, the by-passageway 158a does not have any by-passing or discharging connection with the passageway 149 leading to the hydraulic ram unit 73, and hence opening of the by-passing valve 153a is not operative to permit return flow of oil from the ram unit for lowering the lifting frame. The valve opening plunger 166a is adapted to be opened by a latching foot treadle 184 which is pivotally mounted at its rear end on the pump casting 43. A two-way pivotal connection 185, 186, 187 enables the treadle to be swung sidewise when the treadle has been depressed, as indicated in dotted lines in Figure 4. This sidewise motion enables the treadle to be hooked under a detent shoulder 188 for holding the treadle depressed. A tension spring 189 immediately restores the treadle to its upper raised position as soon as the treadle is kicked sidewise to clear the shoulder 188. Thus, the hold-down shoulder 188 serves to hold the treadle 184 in its depressed position, with the idling or by-passing valve 153a open. The purpose of the by-pass valve 153a is to enable the operator to raise the lifting frame 16 only a short distance, or some intermediate distance short of its upper limit, and then be able to swing the handle 31 freely in its vertical plane for easy maneuvering of the truck, without transmitting further pumping impulses to the lifting frame, and without having to release the handle 31 from the hydraulic pumping mechanism at the latch 64. That is to say, if after raising the load an intermediate distance, the operator desires a free handle 31 without disconnecting this handle from the pumping mechanism, he merely depresses the by-pass treadle 184 so that it becomes latched down temporarily by the shoulder 188. This results in a completely open by-pass through the valve 153a, in shunt of the piston 136, but without releasing the oil which is held under pressure in the hydraulic ram unit 73. It will be noted that this by-pass function for producing a free handle 31 can be obtained at any and all stages of lifting of the lifting frame 16, i. e., at the bottom and at the top of the full lifting range and at all intermediate points. When the by-passing function of the valve 153a is to be discontinued, the latch 188 is released so as to allow the treadle 184 to return to its normal valve closing position.

A load limiting release valve 191 may also be arranged to connect the upper and lower ends of the cylinder 134, in shunt of the piston 136. This load limiting valve is shown as a ball valve which is held to a seat 192 by a relatively heavy compression spring 193. The seat or port 192 communicates with a passageway 194 leading from the horizontal bore 145. When a predetermined maximum pressure of oil acts upwardly through the passageway 194, it unseats the valve 191 and creates a relief flow upwardly through passageway 137' into the upper end of the cylinder 134, thereby by-passing the piston 136 in the event that it is endeavored to lift an excessive load with the lifting truck. The pressure of the spring 193 may be adjusted for establishing different overload relief points by the manipulation of an adjusting screw 195 bearing against the upper end of the spring.

Figure 5:
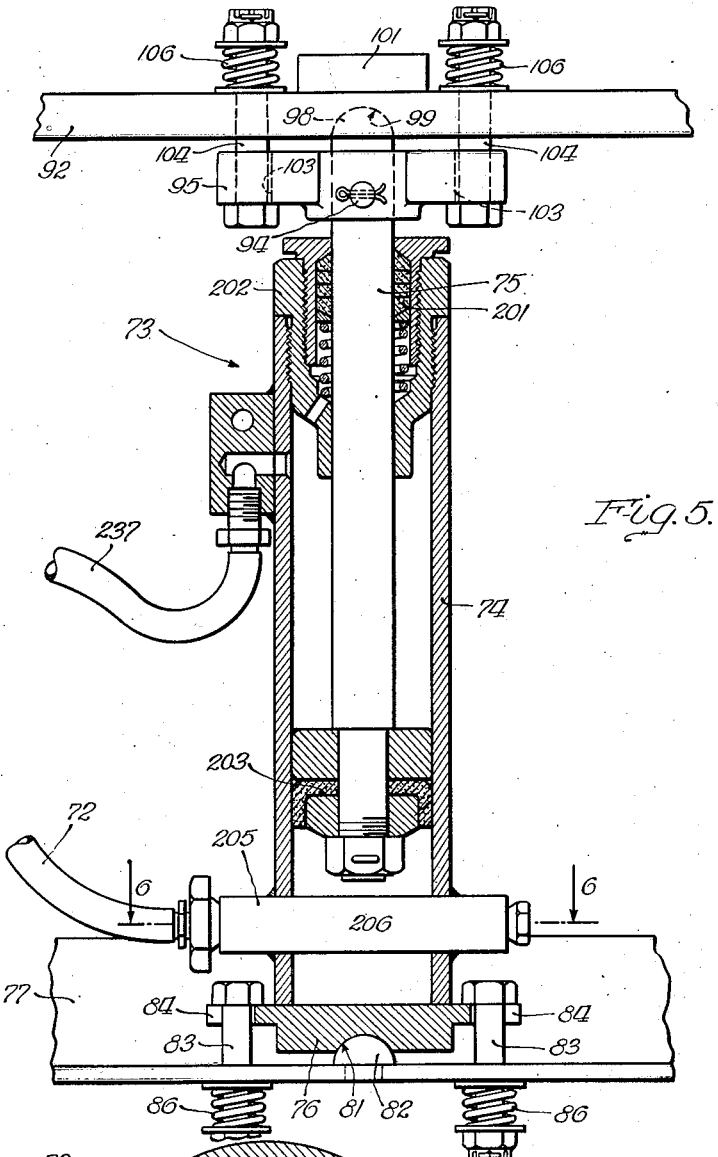
Figure 5 is a sectional view through the hydraulic ram unit taken approximately on the plane of the line 5—5 of Figure 3.
Figure 6:
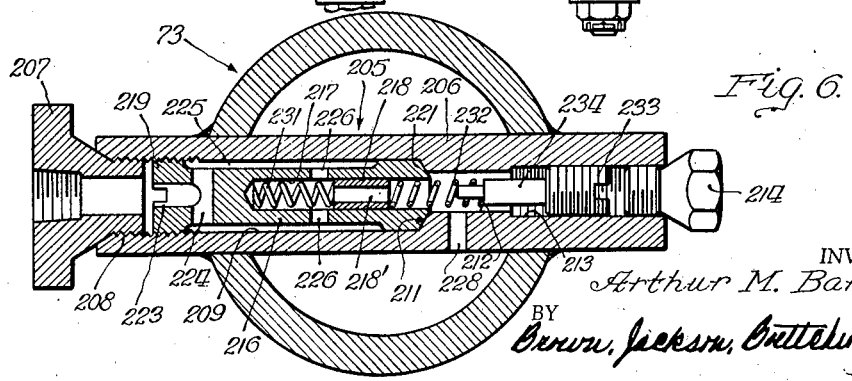
Figure 6 is a detail sectional view taken approximately on the plane of the line 6—6 of Figure 5.

Referring now to the hydraulic ram unit 73, as illustrated in detail in Figures 5 and 6, the piston rod 75 extends downwardly into the cylinder 74 through a suitable gland packing 201 mounted in the upper cylinder head 202, and the lower end of the piston rod carries a conventional piston 203 of the cup leather or other desired type. The oil transmitted under pressure through the flexible conduit 72 enters the lower end of the cylinder 74 through an automatic discharge regulating valve 205. This automatic regulating valve comprises a tubular valve body 206 which is welded or otherwise secured in diametrically opposite openings in the wall of the cylinder 74. The flexible conduit 72 has connection with a suitable coupling 207 which screws into a thread 208 formed at the outer end of a relatively large bore 209. The inner end of this large bore is formed with a tapered seat 211, and extending from this seat is a reduced bore 212 which is threaded at its outer end at 213 for receiving the closure plug 214. Disposed within the relatively large bore 209 is a stationary valve guiding cage 216 having an axial bore 217 within which a spring balanced sleeve valve 218 is mounted for sliding movement. A threaded head 219 at the outer end of the tubular cage screws into the thread 208, and a tapered end 221 at the inner extremity of the cage seats on the tapered seat 211. The oil transmitted under pressure from the pump unit enters an axial passage 223 in the cage and thence flows outwardly through lateral ports 224 into the annular space 225 defined between the reduced intermediate portion of the valve cage and the surrounding inner wall of the tubular valve body 206. From this annular space 225, the oil flows inwardly through radial valve ports 226 which open into the inner bore 217. Thence, the oil flows axially through the hollow sleeve valve 218 to the reduced bore 212, from whence one or more radial ports 228 conduct the oil into the lower portion of the cylinder 74, below the piston 203. A compression spring 231 confined in the inner end of the inner bore 217 tends to shift the sleeve valve 218 toward the right, and a compression spring 232 disposed in the outer end of the bore 217 tends to shift the sleeve valve to the left, the pressures of these two springs being so proportioned that the valve normally occupies a balanced position substantially as indicated, where said valve does not restrict the radially extending ports 226. The pressure of the right hand spring 232 can be adjusted by screwing an adjusting plug 233 inwardly or outwardly within the threaded bore 213, the inner end of this threaded plug carrying a stud 234 on which the outer end of the spring 232 is centered. The orifice 218' through the sleeve valve 218 is of a predetermined size so proportioned with respect to the deflection pressures of the springs 231, 232, and with respect to the load carrying capacity of the lift truck, that the lifting platform 16 will always lower at a substantially constant rate of descent, irrespective of whether the lifting frame is empty or loaded, and irrespective of the size of the load. This constant rate of descent is obtained by the throttling action of the sleeve valve 218 if relatively high pressures in the ram cylinder 74 tend to create too high a reverse flow of oil back to the pump unit in the operation of lowering the load. That is to say, if the hydraulic pressure exerted against the right hand end of the sleeve valve 218 exceeds a predetermined balancing pressure, the sleeve valve starts moving toward the left against the pressure of the spring 231, and in so doing the sleeve starts to throttle the rate of egress of oil outwardly through the radial ports 226. This immediately reduces the rate of flow back to the pump unit, and hence reduces the rate of descent of the lifting platform or frame 16. Thus, an automatic regulating action is imposed on this return flow of oil, whereby there is avoided the possibility of a dangerous rate of descent of the lifting frame under relatively heavy loads. During the lifting operation when oil is being pumped into the lifting ram, the entering oil flows through the passages 223, 224 and 225, and thence passes inwardly through the valve ports 226 and valve 218, without the valve exerting any throttling action on this inward flow through the ports 226.

The various parts of the truck can be quickly and easily assembled and disassembled. For example, the pumping unit 42 together with the piston rod 45, link 47 and rocker lever 49 can be mounted as a unit assembly by merely guiding the slots 50 over the studs 40 and then passing the pivot shaft 41 through the arms 44, 44' and rocker lever 49. The ball and socket mountings at the opposite ends of the ram unit 73 also enable this unit to be readily mounted and dismounted. If desired, a leakage return conduit 237 (Figure 5) may be provided to conduct back to the reservoir 133 any oil which may leak past the piston 203 and tend to accumulate in the upper portion of the ram cylinder 74.

While I have illustrated and described what I regard to be the preferred embodiment of my invention, nevertheless it will be understood that such is merely exemplary and that numerous modifications and rearrangements may be made therein without departing from the essence of the invention.

I claim:

1. In a lift truck, the combination of a front crosshead, steerable front wheels on which said crosshead is mounted, a propelling and steering handle carried by said crosshead and operative to steer said wheels, a lifting frame in rear of said crosshead, supporting wheels for said lifting frame, vertically spaced parallel links pivotally connecting said lifting frame with said crosshead to accommodate lifting movement of said frame, a hydraulic pump mounted on said crosshead, means responsive to actuation of said handle for operating said pump, a hydraulic ram receiving hydraulic pressure from said pump, said ram having one end mounted on said crosshead and having its other end connected to exert lifting force against said lifting frame, levers pivotally mounted on said lifting frame for movement independently of said parallel links, said levers comprising forwardly extending arms adapted to be held by said front crosshead against upward movement when the front end of said lifting frame is raised, and means connecting said levers with said frame supporting wheels for causing lifting movement of said frame relatively to said frame supporting wheels.

2. In a lift truck, the combination of a front frame supported on front wheels, a rear frame supported on rear wheels, said front wheels being steerable, a propelling and steering handle carried by said front frame and operative to steer said front wheels, vertically spaced parallel links pivotally connecting said front and rear frames whereby to accommodate lifting movement of said rear frame relatively to said front frame, a hydraulic pump mounted on said front frame, means responsive to actuation of said handle for operating said pump, a hydraulic ram receiving hydraulic pressure from said pump, said ram having one end mounted on said front frame and having its other end connected to exert lifting force against the front end of said rear frame, and means operating independently of said parallel links and responsive to lifting movement of the front end of said rear frame for causing the rear end of said rear frame to move upwardly relatively to said rear wheels.

3. In a lift truck, the combination of a front frame supported on front wheels, a rear frame supported on rear wheels, said front wheels being steerable, a propelling and steering handle carried by said front frame and operative to steer said front wheels, said front frame comprising a substantially vertical end structure adjacent its rear end and said rear frame comprising a substantially vertical end structure adjacent its front end, upper and lower pairs of substantially parallel connecting links having their front and rear ends pivotally connected with the substantially vertical end structures of said front and rear frames at opposite sides of said frames, said links accommodating parallel link lifting motion of said rear frame in such manner that the major component of the parallel link motion is in the vertical direction, a hydraulic pump mounted on said front frame, means responsive to actuation of said handle for operating said pump, a hydraulic ram receiving hydraulic pressure from said pump, said ram having one end mounted on said front frame and having its other end connected to exert lifting force against the substantially vertical end structure of said rear frame, a bell crank lever pivotally supported on said rear frame comprising a forwardly extending arm carrying a roller which bears against a thrusting surface on said front frame, and actuating means connecting said bell crank lever with said rear wheels whereby said bell crank lever and said actuating means are responsive to lifting movement of the front end of said rear frame for causing the rear end of said rear frame to move upwardly relatively to said rear wheels.

4. In a lift truck, the combination of a front frame supported on front wheels, a rear frame supported on rear wheels, said front frame comprising a substantially vertical end structure adjacent its rear end, and said rear frame comprising a substantially vertical end structure adjacent its front end, upper and lower pairs of substantially parallel connecting links having their front and rear ends pivotally connected with the substantially vertical end structures of said front and rear frames, said links accommodating parallel link lifting motion of said rear frame in such manner that the major component of the parallel link motion is in the vertical direction, a hydraulic pump mounted on said front frame, a hydraulic ram receiving hydraulic pressure from said pump, said ram having one end mounted on said front frame and having its other end connected to exert lifting force against said rear frame, and means movable independently of said parallel connecting links for causing the rear end of said rear frame to move upwardly relatively to said rear wheels.

5. In a lift truck, the combination of a wheeled cross-head constituting the front portion of the truck, a wheeled lifting frame constituting the rear portion of the truck, vertically spaced parallel links pivotally connecting said lifting frame with said crosshead to accommodate lifting movement of said frame, and lifting means movable independently of said parallel links for exerting lifting force on the front and rear portions of said lifting frame.

6. In a lift truck, the combination of a front crosshead, steerable front wheels on which said crosshead is mounted, a propelling and steering handle carried by said crosshead and operative to steer said wheels, a lifting frame in rear of said crosshead, rear supporting wheels for said lifting frame, vertically spaced parallel links pivotally connecting said lifting frame with said crosshead to accommodate lifting movement of said frame, means responsive to actuation of said handle for exerting lifting force on said lifting frame, and means movable independently of said parallel links for causing lifting movement of said frame relatively to said rear supporting wheels.

7. In a lift truck, the combination of a front frame supported on front wheels, a rear frame supported on rear wheels, said front wheels being steerable, said front frame comprising a substantially vertical end structure adjacent its rear end, and said rear frame comprising a substantially vertical end structure adjacent its front end, upper and lower pairs of substantially parallel connecting links having their front and rear ends pivotally connected with the substantially vertical end structures of said front and rear frames, said links accommodating parallel link lifting motion of said rear frame in such manner that the major component of the parallel link motion is in the vertical direction, lifting means for transmitting lifting force from said front frame to said rear frame, and mechanism movable independently of said parallel connecting links for causing lifting movement of the rear portion of said rear frame relatively to said rear supporting wheels.

8. In a lift truck, the combination with wheeled supporting means, a lifting frame, and a lifting lever, of hydraulic lifting mechanism comprising a hydraulic pump actuated by said lifting lever, a fluid reservoir connected with said pump, a hydraulic ram receiving hydraulic pressure from said pump and exerting lifting pressure against said lifting frame, and means for automatically opening a return flow passage from said ram back to said reservoir for interrupting the lifting action of said ram when said lifting frame has been raised to a predetermined height.

9. In a lift truck, the combination with wheeled supporting means, a lifting frame, and a lifting lever, of hydraulic lifting mechanism for said frame comprising a hydraulic pump actuated by said lifting lever, a fluid reservoir connected with said pump, a hydraulic ram receiving hydraulic pressure from said pump and exerting lifting force against said lifting frame, and a dual purpose valve serving both to automatically limit the lifting movement of said lifting frame and also to lower said lifting frame by permitting a return flow of fluid from said ram to said reservoir.

10. In a lift truck wherein a lifting frame is adapted to be raised to load carrying position, the combination therewith of hydraulic lifting mechanism comprising a hydraulic pump, means for actuating said pump, a liquid reservoir for said pump, a hydraulic ram receiving hydraulic pressure from said pump and exerting lifting force against said lifting frame, a dual purpose release valve communicating with said hydraulic ram and with said liquid reservoir, manual means operating through said release valve for permitting a return flow of liquid from said ram to said reservoir for lowering said lifting frame, and automatic means operating through said same release valve for interrupting the further transmission of hydraulic pressure to said ram after said lifting frame has been raised to a predetermined height.

11. In a lift truck, the combination with wheeled supporting means, a lifting frame, a steering head, and a steering handle fulcrumed on said steering head, of hydraulic lifting mechanism for raising said lifting frame by the operation of said steering handle comprising a hydraulic pump adapted to be actuated by said steering handle, a hydraulic ram receiving hydraulic pressure from said pump and exerting lifting force against said lifting frame, a by-pass valve operable to establish a by-pass flow around said hydraulic pump for freeing said steering handle from hydraulic lifting at any stage in the range of lifting movement of said lifting frame, a pedal adapted to actuate said valve, means mounting said pedal for vertical movement and sidewise movement, and latch means adapted to be engaged by sidewise movement of said pedal for holding the latter in one position with said by-pass valve open.

12. In a lift truck, the combination of a wheeled steering head, a lifting frame, substantially parallel links pivotally connecting said steering head with said lifting frame to accommodate lifting movement of said frame, a lifting lever, a hydraulic pump actuated by said lifting lever, a hydraulic ram receiving hydraulic pressure from said pump and exerting lifting force against said lifting frame, rear wheels for said lifting frame, swinging wheel supports connecting said wheels with said frame, and means operating independently of said parallel links and responsive to relative motion between said steering head and said lifting frame for swinging said wheel supports.

13. In a lift truck, the combination of a front frame, steerable front wheels for said front frame, a steering handle for towing the truck and steering the wheels, a lifting frame in rear of said front frame, vertically spaced parallel links pivotally connecting said front and rear frames whereby to accommodate lifting movement of said rear frame relatively to said front frame, lifting mechanism actuated by said steering handle for exerting lifting force against said rear frame, rear wheels supporting the rear end of said lifting frame, swinging wheel support means connecting said rear wheels with said lifting frame, link means extending forwardly from said wheel support means, and bell crank lever means movable independently of said parallel links and actuated by relative vertical movement between said frames for imparting motion to said link means, said bell crank lever means being pivotally supported on said rear frame and comprising forwardly extending arms carrying rollers which bear against a thrusting surface on said front frame that prevents upward movement of said rollers when the front end of said rear frame is raised.

14. In a lift truck of the class described, the combination of a front frame supported on front wheels, a rear frame supported on rear wheels, said front wheels being steerable, a propelling and steering handle carried by said front frame and operative to steer said front wheels, pairs of parallel links pivotally connecting said front frame with said rear frame to accommodate lifting movement of said rear frame, a transverse mounting shaft carried by said front frame, a hydraulic pump pivotally suspended from said mounting shaft, a rocker lever pivotally supported on said mounting shaft, said pump comprising a reciprocable piston, means pivotally connecting said rocker lever with said piston, a pumping lever pivotally mounted on said front frame, latch means establishing a releasable mechanical connection between said propelling and steering handle and said pumping lever, a motion transmitting strut, universal joints connecting one end of said strut with said rocker lever and connecting the other end of said strut with said pumping lever, whereby said propelling and steering handle is operative to transmit pumping impulses to said pump when disposed at different steering angles, a hydraulic ram receiving hydraulic pressure from said pump, said ram comprising a cylinder member and a coacting piston member, means pivotally connecting one of said ram members with said front frame, and means pivotally connecting the other of said ram members with said rear frame.

15. In a lift truck, the combination of a front frame supported on front wheels, a rear frame supported on rear wheels, said front wheels being steerable, a propelling and steering handle carried by said front frame and operative to steer said front wheels, vertically spaced pairs of parallel links pivotally connecting said front frame with said rear frame to accommodate lifting movement of said rear frame, a hydraulic pump mounted on said front frame, means for actuating said pump from said propelling and steering handle, a hydraulic ram receiving hydraulic pressure from said pump and transmitting lifting force from said front frame to said rear frame, an oil reservoir for said hydraulic pump, a relief valve for permitting a return flow of oil to said reservoir, manual means for actuating said relief valve to permit lowering of said rear frame, automatic means for actuating said relief valve when said rear frame has been lifted to a predetermined height, a by-pass valve for by-passing oil from said pump to said reservoir, manual means operable to open said by-pass valve to free said steering handle from hydraulic lifting at any stage in the range of lifting movement of said rear frame, and automatic throttling means for automatically controlling the rate of return flow of oil from said hydraulic ram to said reservoir for controlling the rate of descent of said rear frame.

16. In a lift truck wherein a lifting frame is adapted to be lifted by a hydraulic ram receiving hydraulic pressure from a hydraulic pump which is adapted to draw liquid from a liquid reservoir, the combination therewith of a conduit for transmitting hydraulic pressure from said pump to said hydraulic lifting ram, a release valve communicating with said conduit and with said reservoir for permitting a return flow of liquid from said ram back to said reservoir for lowering said lifting frame, and automatic pressure responsive valve means interposed in said conduit between said release valve and said ram for automatically governing the rate of return flow of liquid from said ram to said reservoir for automatically controlling the rate of descent of said lifting frame, said automatic pressure responsive valve means comprising a unidirectional throttling means which is only effective to exert throttling action against the return flow of liquid occurring in the lowering operation and is not effective to exert throttling action against the forward flow of liquid in the lifting operation.

17. In a hydraulic lifting system for raising the lifting frame of a lift truck which is adapted to be steered and propelled by a steering handle, the combination therewith of a hydraulic pump actuated by said steering handle, a fluid reservoir connected with said pump, a hydraulic ram for receiving hydraulic pressure from said pump and exerting lifting force against said lifting frame, a pressure transmitting conduit for transmitting hydraulic pressure from said pump to said lifting ram, a dual purpose release valve and a manually actuated by-pass valve both communicating with said pressure transmitting conduit at the pump end thereof, manual means operating through said release valve for permitting a return flow of liquid from said ram to said reservoir for lowering said lifting frame, automatic means operating through said same release valve for interrupting the further transmission of hydraulic pressure to said ram after said lifting frame has been raised to a predetermined height, manual means for actuating said by-pass valve to establish a by-pass flow around said hydraulic pump for freeing said steering handle from hydraulic lifting, and an automatic pressure-responsive throttling valve interposed in said pressure transmitting conduit at the ram end thereof for automatically governing the rate of return flow of liquid from said ram to said reservoir for automatically controlling the rate of descent of said lifting frame, said automatic pressure responsive throttling valve comprising a unidirectionally acting throttling device which is only effective to exert throttling action against the return flow of liquid occurring in the lowering operation and is not effective to exert throttling action against the forward flow of liquid in the lifting operation.

18. In a lift truck, the combination of a front frame, steerable front wheels for said front frame, a steering handle for towing the truck and steering the wheels, a lifting frame in rear of said front frame, vertically spaced parallel links pivotally connecting said front and rear frames whereby to accommodate lifting movement of said rear frame relatively to said front frame, lifting mechanism actuated by said steering handle for exerting lifting force against said rear frame, rear wheels supporting the rear end of said lifting frame, swinging wheel supports connecting said rear wheels with said lifting frame, lever means pivotally mounted on one of said frames for movement independently of said parallel links, said lever means comprising an arm coacting with the other of said frames for controlling the movement of said lever means, and means connecting said lever means with said swinging wheel supports for swing the latter.

19. In a lift truck, the combination of a wheeled steering head, a lifting frame, substantially parallel links pivotally connecting said steering head with said lifting frame to accommodate lifting movement of said frame, a lifting lever, lifting mechanism actuated by said lever for exerting lifting force against said lifting frame, rear wheels for said lifting frame, swinging wheel supports connecting said wheels with said lifting frame, and means movable independently of said parallel links and responsive to relative vertical motion between said steering head and said lifting frame for swinging said wheel supports.

ARTHUR M. BARRETT.